Oct. 17, 1961  G. W. ARMSTRONG ET AL  3,004,662
FOREIGN BODY DETECTOR
Filed Feb. 25, 1957  3 Sheets-Sheet 1

INVENTOR.
GEORGE W. ARMSTRONG
ROBERT J. NEFF
BY Toulmin & Toulmin
ATTORNEYS

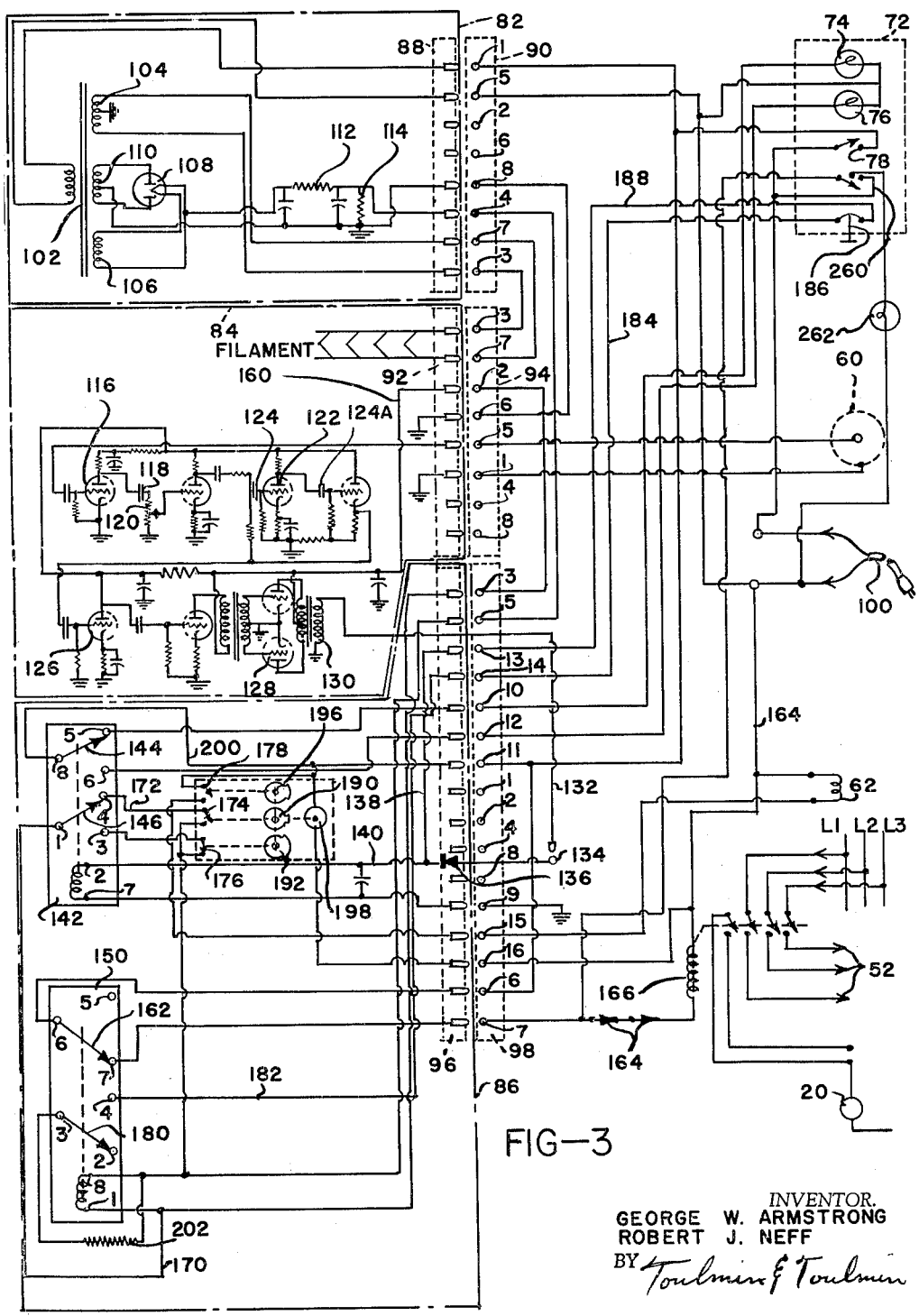

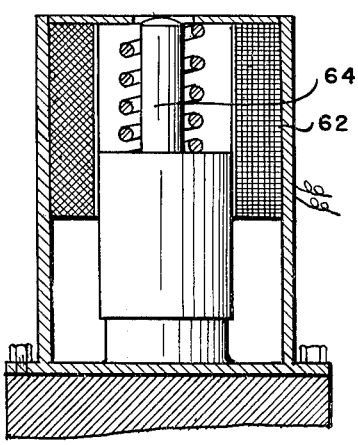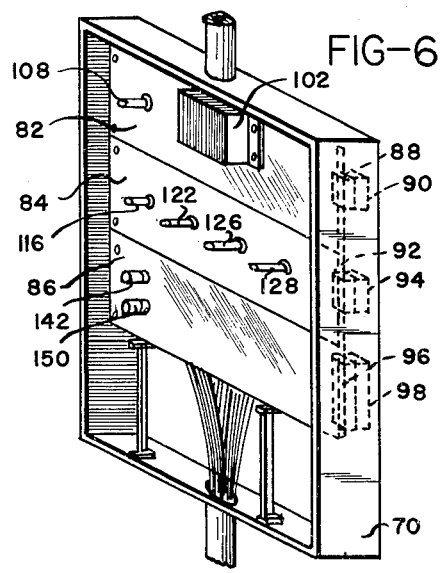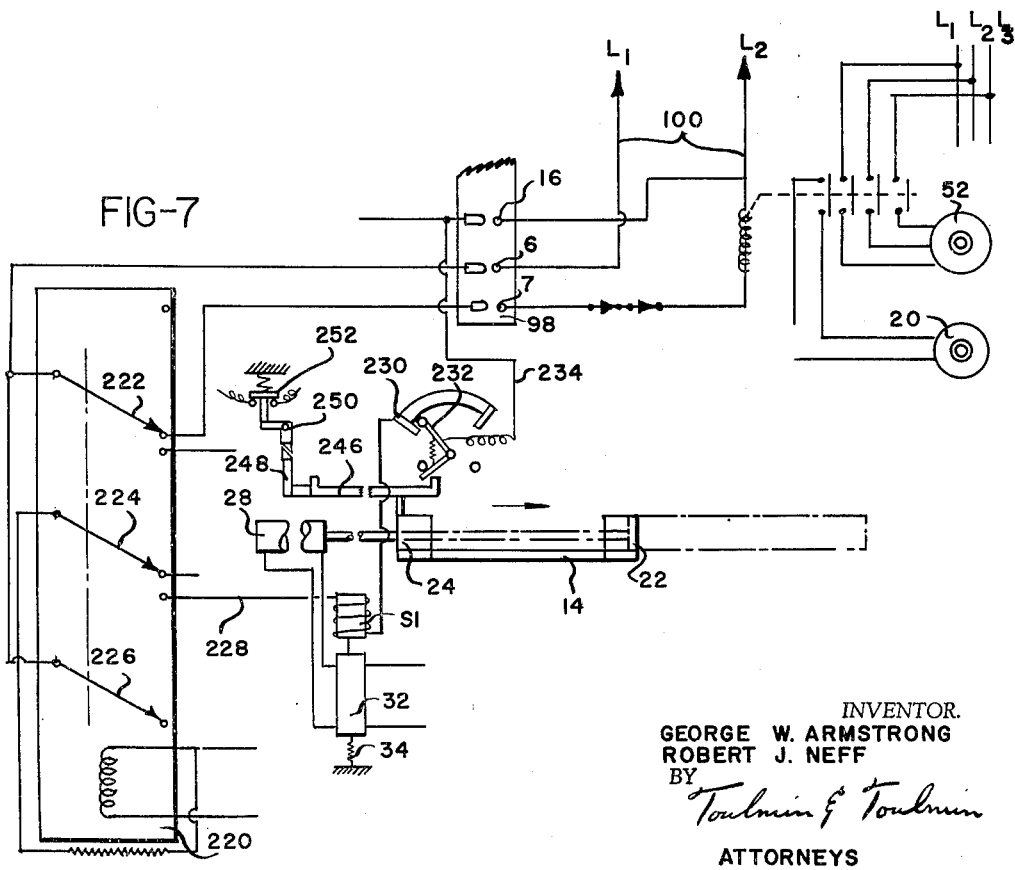

United States Patent Office 3,004,662
Patented Oct. 17, 1961

3,004,662
FOREIGN BODY DETECTOR
George W. Armstrong, 114 Schneider Drive, Fairborn, Ohio, and Robert J. Neff, Fairborn, Ohio (R.R. 1, Medway, Ohio)
Filed Feb. 25, 1957, Ser. No. 642,021
24 Claims. (Cl. 209—72)

This invention relates to a method and apparatus for detecting foreign bodies in material, particularly bulk material, and is especially concerned with a method and apparatus for detecting such foreign bodies as the material is being conveyed. In a still further sense the present invention is concerned with a method and apparatus for automatically detecting and ejecting foreign bodies from material as it is being conveyed by the apparatus.

In a great many work operations, particularly where materials are to be processed through cutting or other size reducing operations, it is extremely important for foreign bodies of a different texture than the material being handled to be prevented from reaching the mechanism in which the material is to be handled. Specific examples of such processing are found in connection with the crushing or grinding of grain or the shelling or grinding of corn and in cutting of hay. All of these materials are characterized in being particularly apt to have foreign bodies such as stones, or pieces of metal which might be pieces broken from a farm implement entained therein. Since the mechanism in which these materials are processed, consisting of shellers, cutters, hammer mills, and the like are generally of cast iron, it follows that stone or pieces of metal in the material being processed is very likely to break the mechanism thus causing expensive repairs and, what is sometimes even of greater importance, a shut down of a substantial portion of the plant in which the mechanism is located.

It has been attempted to separate such foreign bodies by centrifugal action and by other methods to cause settling of the heavier particles and by flotation in which the grain or other materials to be processed are floated off while the foreign materials, stone and the like, sink to the bottom of the floating chamber. All of these methods, however, have certain drawbacks and, in particular, a drawback common to all known methods is that none are characterized in being operable during the rapid and continuous movement of the material being treated. Such movement of the material is important in a grain mill or the like because during periods of heavy operation storage capacity is not available to receive the incoming corn or the like until broken down machinery is repaired.

Having the foregoing in mind, it is a particular object of the present invention to provide a method and apparatus in which foreign particles of any type likely to damage cutting equipment of the nature referred to can be detected in the material to be treated in the mechanism.

A further object of this invention is to provide a method and apparatus as referred to above which will detect the presence of foreign bodies in the material during the continued movement of the material along a conveyor.

A still further object of this invention is the provision of the detecting means for detecting foreign bodies and material to be processed which will detect the said foreign bodies regardless of the material of which they are composed, for example, stone, metal, wood, or plastic.

A particular object of the present invention is the provision of a method and apparatus for detecting the presence of foreign bodies in a stream of moving material and for ejecting a foreign body from the stream so that it does not continue on to subsequent processing stations.

Another object of the present invention is a method and apparatus for detecting foreign bodies in streams of moving material wherein the presence of a foreign body occasions stoppage of movement of the material, ejection of the foreign body therefrom, and then recommences the said movement whereby fully automatic operation is had.

A still further object of this invention is the provision of a method and apparatus for detecting foreign bodies in material to be processed which has wide adaptability and which can be utilized for detecting foreign bodies under substantially any circumstances wherein the said foreign body is characterized by a substantial difference in density or surface hardness from the material from which it is to be separated.

A still further object of the present invention is the provision of a device adapted for being installed in a conveyor line and which is operable for shutting down the line upon the detection of a piece of foreign material passing from the conveyor line on to the device.

Another object of the present invention is an apparatus of the nature referred to which consists of relatively simple individual components whereby the device is inexpensive to construct and which is substantially trouble-free and easy to repair.

Another object of the present invention is the provision of a method and apparatus of the nature referred to in which the operability of the device is automatically checked periodically whereby any failure of the device to remain in operation will cause immediate shutdown thereof.

Another object of this invention is the provision of an arrangement of electrical auxiliaries in a control box in which the auxiliaries are mounted on a panel detachable from the box and wherein installation of a panel causes automatic connection thereof into the circuit thus permitting easy replacement of the panels when necessary.

These and other objects and advantages will become more apparent upon reference to the accompanying drawings in which:

FIGURE 3 is a diagrammatic representation of a preferred form which the electrical circuit according to this invention takes;

FIGURE 5 is a sectional view indicated by line 5—5 on FIGURE 1 showing a device employed in connection with the unit of this invention for checking the operability thereof periodically;

FIGURE 6 is a perspective view showing the control box and the detachable panels mounted therein; and FIGURE 7 is a view showing a portion of the electric circuit modified so as to include an arrangement for automatically ejecting the foreign bodies from the material.

*General arrangement*

Figure 1:
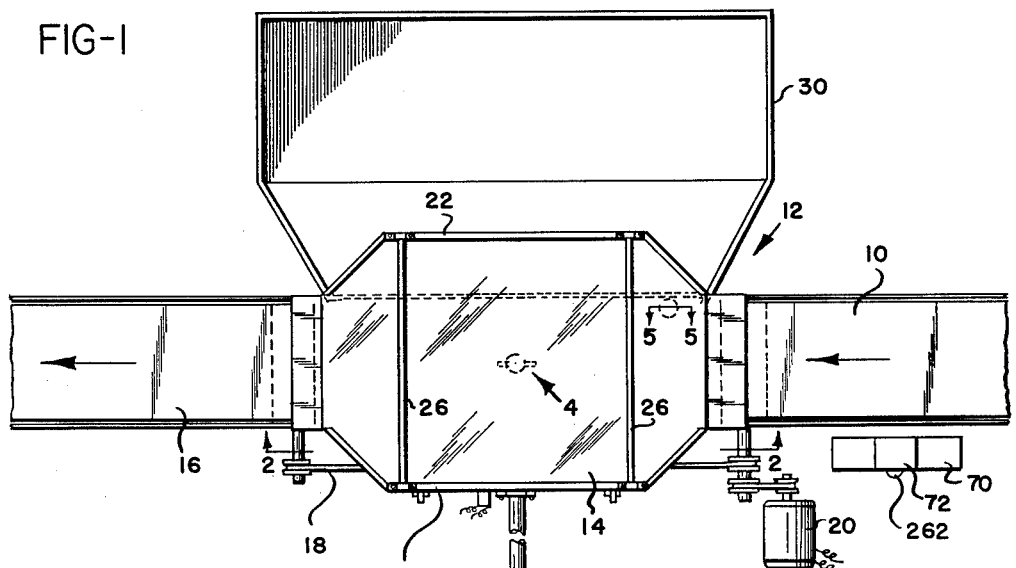
FIGURE 1 is a plan view looking down on top of a foreign body detecting device according to the present invention.
Figure 4:
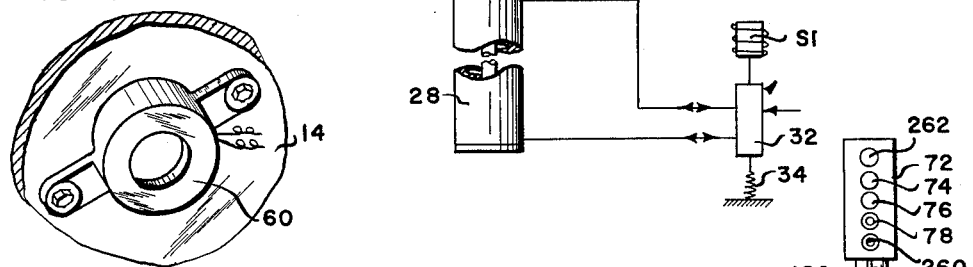
FIGURE 4 is a perspective view showing the manner in which a pick-up transducer is attached to the plate forming the bottom of the detector unit of this invention.

The present invention is predicated on the fact that most materials to be processed and foreign bodies that might be entrained therein that would cause damage to the processing mechanism are of considerably different density or surface hardness. For example, stones and pieces of steel or aluminum or any metal would be of considerably different density for even the hardest, driest grain that might be processed, even dry field corn. This difference in density is utilized according to the present invention to actuate a detecting mechanism which will either give a signal upon detecting the presence of a foreign body, or will stop the movement of the stream, or in a refined form of the invention, will automatically eject the foreign body from the stream of material.

In one form of the invention, the foregoing is accomplished by passing the material to be processed across a stiff plate, metal or the like, which vibrates at sufficient rapidity and with sufficient amplitude to cause the material to bounce thereon. Any foreign bodies in the material will thus be shaken downwardly therein and strike the plate thereby causing the plate to ring or, in any case, to set up frequencies therein different from what is created therein by the said material.

By detecting vibrations of the plate with a transducer and amplifying the signal and filtering out the frequencies which it is known are made in the plate by the material being processed, the other frequencies can be utilized to show the presence of a foreign body striking the plate.

The signal from the frequencies developed by the unwanted bodies are employed to trip a relay that will either stop movement of the material or will both stop movement and cause ejection of the foreign bodies and thereafter restore movement of the material.

In order to make certain that the device remains in proper operative condition at all times, the present invention also includes the provision of a striker which is made selectively effective for striking the plate at predetermined intervals, preferably at intervals no greater than would require a particle of material to traverse the plate and if the detecting circuit is operative, the mechanism will remain in operation, whereas, if the detecting circuit is faulty the mechanism will halt immediately after the striker operates.

According to the present invention the plate forming the bottom of the device over which the material is passed is preferably either tilted so that as the plate vibrates the material passes thereover in one direction or preferably, the plate is arranged to vibrate in a direction having a component in the direction in which it is desired for the material to move over the device and thereby the detecting action of the device is combined with a conveying action.

The essential thing relative to the movement of the material over the plate or stiff member is that the material strike the plate or member and be in a loose flowable condition so that foreign bodies entrained in the material will also strike the plate or stiff member. Thus, while the plate or stiff member may be caused to vibrate in order to cause material to be conveyed across the plate, it is also possible for the plate to be stationary and for the material to be poured on the plate, or moved across the plate with agitation. The plate, in such a case, could either be horizontal or inclined and could be substantially vertical so long as the material and any foreign bodies entrained therein would be caused to strike the plate. The plate is disclosed in the particular arrangement illustrated as a flat member but, obviously, the plate or stiff member could be curved, even to the extent of being a complete cylinder, if so desired.

*Structural arrangement*

Figure 2:
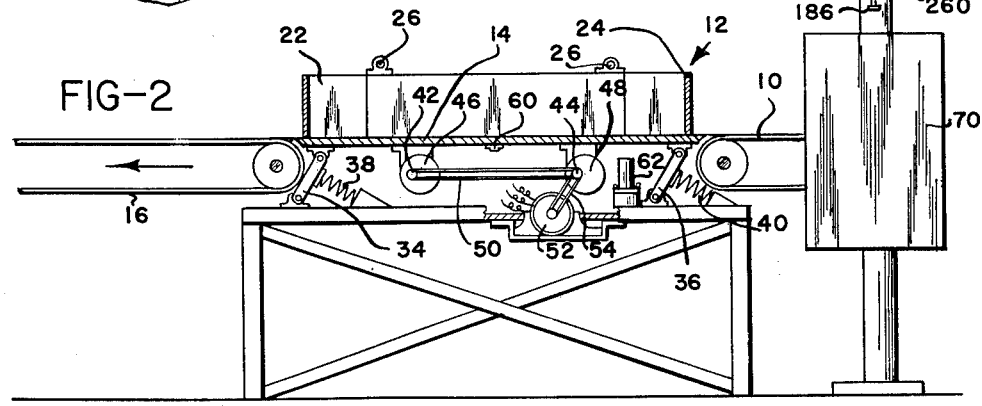
FIGURE 2 is a side elevation of the device of FIGURE 1 part of section showing the vibrator mechanism and the like associated therewith.

Referring first to FIGURES 1 and 2 there is shown a conveyor as at 10 which may comprise a drag conveyor or a belt arrangement as illustrated and which conveyor 10 delivers to the device 12 which is constructed according to the present invention. Device 12 comprises a metal bottom plate 14, about ¼" to 3/16" metal plate, and at the side thereof opposite conveyor 10 there is a conveyor 16 that carries material from the device.

The conveyors 10 and 16 may be connected to run together as by the chain 18 and a drive motor 20 is provided for powering the conveyors.

As will be seen in FIGURES 1 and 2 the plate 14 forming the bottom of the device 12 is provided with side walls 22 and 24 and these form a passage which diverges from the end of conveyor 10. The purpose of this is to insure that the material delivered from conveyor 10 to plate 14 will spread out on the plate so that any foreign bodies therein will have a chance to shift down into the material and strike the plate 14.

The side walls 22 and 24 are advantageously interconnected as by rods 26 and there is an air motor 28 connected with wall 24 which is operable for thrusting the walls to one side of plate 14 whereby all material on the plate 14 is discharged into a bin 30. As will be seen hereinafter this arrangement can be employed for discharging from the plate an entire load of material when a foreign body is detected therein.

A valve 32 is connected with motor 28 and is biased by a spring 34 in a direction to cause the motor to position the side walls as they are illustrated in FIGURE 1. Energization of the solenoid S1 pertaining to the valve will shift the valve 32 to energize the motor 28 to move the side walls 22 and 24 so as to discharge the material on plate 14 into bin 30.

Many arrangements of supporting and vibrating plate 14 are possible but one arrangement that could be utilized is illustrated in FIGURE 2 wherein it will be noted that plate 14 is mounted on arms 34 and 36 against which bear the compression springs 38 and 40. It will be evident that the vibration of the plate 14 will cause it to have a component of movement toward the left on its upward travel and that material placed on the plate will thus bounce toward the left thereabout when vibrated.

Vibration of the plate can also be accomplished in a number of different manners but for the purpose of the present disclosure there is illustrated the shafts 42 and 44 having the off center masses 46 and 48 thereon. The shafts are connected by a chain 50 and a drive motor 52 is connected with one of the shafts by a chain 54 extending in the same direction as the arms 34 and 36 and with the distance from the center of the motor of the said shaft being the same as the length of one arm. In this manner the energization of the motor will bring about rotation of the shafts 42 and 44. The rotation of shafts 42 and 44 will cause the off center masses 46 and 48 to rotate in unison and this will set up forces on the plate causing the plate to shake in an arcuate direction determined by the support arms 34 and 36 which are pivoted at their upper ends to the plate and which are pivoted at their lower ends to stationary supports. This sort of shaking plate conveyor is well known and is one manner In which the material can be caused to advance across the plate with simultaneous agitation of the material so that it will strike the plate in a vibration creating manner and so that any foreign bodies entrained in the material will also be caused to strike the plate and set up vibrations therein. This will cause vibration of the plate 14 in a manner to cause material thereon to bounce on the plate while simultaneously moving leftwardly thereacross. The periodicity of such vibrations can vary considerably, but it is believed vibrations from about 500 to 2000 cycles per minute will be adequate for most materials.

Associated with plate 14 attached thereto in any suitable manner is a transducer pick-up 60 which detects vibrations in the plate substantially higher than the vibrations established in the plate by its shaking motion. This transducer is connected into an electrical circuit to be described presently and the vibrations picked up thereby are thus utilized for operating the control system.

Also pertaining to the plate is a solenoid operated plunger means indicated in FIGURE 5 and which consists of a solenoid 62 and a plunger 64 therein which moves upwardly when the solenoid is energized so as to be in position to be struck by plate 14 as the plate shakes or vibrates. The purpose of plunger 64, as will be seen hereinafter, is to create artificially those vibratory conditions which would be established by the presence of harmful foreign bodies on plate 14 whereby the operability of the control system can be checked. In practice the plunger 64 is raised to the point where it will strike the plate about once every three seconds which is estimated to be the time that it will require material to traverse the plate 14. The interval between the times that the plunger 64 is moved into operating position will, of course, vary with the speed of the conveyed material and the size of the plate.

*Electrical control system*

The control of the operation of the vibrating plate conveyor is effected by a control system housed within a control box 70 that may be positioned closely adjacent the vibrating conveyor. Associated with the control box 70 is a switch housing 72 which may contain the green light 74 indicating that the device is in operation and the red light 76 that will indicate when the device has halted because of the presence of a foreign body. A selector switch 78 is employed for turning the device on and off and another switch 260 is provided by means of which the control system can be by-passed so that the conveyor and vibrating panel can be operated to move material even though the detecting mechanism is not in operative condition.

Located within control box 70, as will be seen in FIGURE 6, are three detachable panels 82, 84 and 86. These panels are chassis members on which the tubes and resistors and capacitors and other circuit elements making up the control system are mounted. The arrangement is such that the elements are separated into groups and this greatly facilitates any repair work that is necessary to do on the control system. For example, the upper panel, panel No. 1 is the power supply, panel No. 2 directly thereunderneath is the amplifier section, and panel No. 3 at the bottom is the relay panel and also supports the mechanism that periodically checks the operating efficiency of the device.

The panel 82 has at one end one portion 88 of a separable connector of which the other portion 90 is fixedly mounted in the control box. Similarly, the second panel has one portion 92 of a separable connector of which the other portion 94 is fixedly mounted in the control box. The third panel 86 is also provided with one portion 96 of a separable connector of which the other portion 98 is mounted in the control box. Each of the portions 88, 92 and 96 of the separable connectors is wired to the circuit elements on the pertaining panel and the stationary portions of connectors 90, 94 and 98 are inter-connected and are also connected with the external circuit elements so that merely placing the individual panels in position in the control box completes the circuits.

The turning now to FIGURE 3, the panels referred to are outlined in dot dash outline and are identified by their reference numerals and to the right side thereof will be noted the elements of the separable electrical connectors of which the right-hand parts are carried in the control box.

The control circuit has a supply line at 100 for supplying 115 volts to the control system and one side of this line is connected through the switch 78 in switch housing 72 so that when the switch is closed the said wire is connected with the contact numbered 1 on the connector part 90 and with the contacts numbered 11 and 6 on the separable connector part 98.

The other side of the incoming line 100 is connected with contact 5 of the connector part 90 and it will be seen that the contacts 1 and 5 supply the opposite ends of the primary of transformer 102 in the power supply section of the control circuit. This transformer comprises a secondary 104 for supplying the filaments of the various tubes making up the control system, another secondary 106 for supplying the filaments of the rectifier tube 108 and a center tapped secondary 110 for supplying the plates of the rectifier tube; the center tap from the last mentioned secondary and a wire leading from the filament of the tube are connected via a filter 112 with terminals on the connector part 88 that plugs into the contacts marked 8 and 4 on connector part 90. The wire leading to contact 4 is connected to the ground via resistor 114.

The opposite ends of secondary coil 104 are connected through the elements of the separable plug with wires leading to contact elements marked 3 and 7 on the separable plug part 94 of panel No. 2 on which are mounted all of the tubes other than the rectifier tube and these contacts are connected with the filaments of the said tubes.

The previously mentioned contact on element 90 numbered 8 is connected with the one numbered 6 on connector part 94 and this contact, when panel No. 2 is plugged in is connected directly with the ground. The contact marked 4 on connector part 90 is thus the high voltage supply and this is connected with contact marked 5 on connector part 98 of panel No. 3.

The previously mentioned transducer pick up 60 is connected to contacts 1 and 5 of the connector part 94 and when panel No. 2 is in place contact 1 is grounded while contact 5 is connected to form the input to the left-hand grid of a dual tube 116 which forms a pre-amplifying stage. The output of the left-hand side of the tube supplies energy through a condenser 118 and an adjustable resistor 120 to the grid of the right-hand side of the tube and resistor 120 is effective for varying the sensitivity of the control system as will be seen hereinafter. The tube 122 to the right of tube 116, also is a dual tube and provides a frequency limiting stage and included in this staging are the capacitors 124 and 124A which can be made variable in order to determine the frequency limitations of the circuit.

The next tube in the circuit, indicated at 126 is also a duel tube and the lefthand side thereof is an amplifying stage and the right side thereof forms the driver for the dual tube 128 which forms a push-pull amplifier feeding the primary of transformer 130. The secondary of transformer 130 has one end grounded and the other end is connected by a wire 132 and a plug in connector 134 through a rectifier 136 with a wire which has one part 138 leading to the plug that makes contact with contact 13 of the separable connector 98 while another part of wire 140 leads to one end of the control coil of an enclosed plug in type contactor 142. The other side of the said control coil leads to the terminal which makes contact with the contact marked 9 on the separable connector 98 which is grounded. It will be evident that a signal of a pre-determined amount will cause energization of the coil of relay 142 and move its upper arm 144 and its lower arm 146 downwardly from their normal upward position.

The upper blade 144 of the contactor is connected with the plug on connector part 96 that engages the contact numbered 11 on connector part 98 which leads to the side of switch 78 opposite the supply of power thereto. The upper contact which arm 144 normally engages is arranged to be connected with the contact marked 10 on connector part 98. This contact is connected with one side of the green light 74 previously referred to, the other side of which is connected with the side of line 100 opposite that in which switch 78 is located. It will be evident that the green light 74 is normally illuminated.

The contact of the relay which arm 144 engages when the relay is energized is arranged to be connected with the contact marked 12 of the connector part 98 and this contact is connected with one side of the red light 76 and the other side thereof is connected with the line 100 so that whenever relay 142 is energized the green light will be extinguished and the red light will be illuminated.

The number 3 panel in the control box has a second relay of the enclosed plug-in type mounted thereon and this is indicated at 150 and this relay has a control coil that has one side connected with the wire that leads to the contact marked 5 of the separable connector 98 which, as has previously been mentioned is connected with the high voltage side of the power supply. The other side of the operating coil of relay 150 is arranged to be contacted with the contact marked 3 of the separable connector 98 and this contact is inter-connected with the contact marked 2 of the separable connector 94 pertaining to panel No. 2 and this contact is arranged to be connected with the high voltage side with the detector circuit via the wire 160.

It will be evident at this point that when the circuit is placed in operation, the detector circuit will not become operative until the power supply has warmed up and there is a supply through the operating coil of relay 150 thus insuring that the entire system will become operative at one and the same time.

Relay 150 is normally energized when the conveyor is operating and is de-energized to stop the conveyor. When the relay is energized and in which condition it is illustrated in FIGURE 3, the upper arm 162 thereof closes on a lower contact that is arranged to be connected with contact 7 on separable plug 98 and from which contact there leads a wire through the thermally responsive elements 164 to one end of the relay operating coil 166 of the three-phase relay that controls connection between the power lines L1, L2 and L3 and the wires leading to motor 52 that vibrates the plate 14. This contactor also controls the circuit to the conveyor motor 20 so that the conveyor motor and the vibrator motor are energized and de-energized simultaneously. Blade 162 is connected with a wire which is connected with the contact marked 6 of the separable connector 98 and this connector is, in turn, connected, as mentioned before, with the side of line 100 of selector switch 78. The other side of the line is connected by wire 164 with the end of relay coil 166 and it will therefore be apparent when the actuating coil or relay 150 is energized, relay coil 166 is also energized. De-energization of the actuating coil of relay 150 will, of course, break the circuit to relay coil 166 causing immediate de-energization thereof.

It has been mentioned that the lower side of energizing coil for relay 150 is connected to supply the load circuit of the detector circuit. This lower side of the said energizing coil for relay 150 is also connected by a wire 170 with blade 146 of relay 142. This blade is normally in its upper position where it closes on a contact connected by a wire 172 with one side of a normally open switch 174, the other side of which is connected with the upper end of the energizing coil of relay 150. At this point it will be evident that closing of switch 174 will short-circuit the energizing coil of relay 150 thus permitting the relay to open while at the same time maintaining voltage supply to the plate circuit of the tubes of the detector unit mounted on panel No. 2.

The wire leading from switch 174 to the upper end of the energizing coil of relay 150 is also connected with one side of a normally closed switch 176, the other side of which is connected with the contact in relay 140 that the blade 146 closes on when relay 142 is energized.

Still a third switch 178 is located adjacent to switches 174 and 176. Switch 178 is normally open and has one side connected with contact 15 of the connector part 98 and its other side connected with contact 12 thereof when panel No. 3 is in position. Contact 11 is connected, as mentioned before, with the side of line 110 containing the switch 78. Contact 15, on the other hand is connected with one side of solenoid 62 of the striker illustrated in FIGURE 5, and the other side of the striker is connected with the unswitched side of line 100. It will be evident that closing of switch 178 will cause energization of solenoid 62.

Relay 150 comprises a second blade 180 which is closed on an open contact when the relay is energized but which closes on another contact when the relay is de-energized which is connected by wire 182 with contact 14 of separable connector 98 and which contact is connected by wire 184 with one side of a normally closed reset switch 186 located in the switch housing 72 while the other side of said switch is connected by wire 188 with terminal 13 of eparable connector 98 and which terminal is connected, as previously mentioned, by wire 138 with wire 140 leading to the upper end of the operating coil of relay 142.

The three switches 174, 176 and 178 are operated by the cams 190, 192 and 196 respectively which are inter-connected to rotate in unison by a synchronous motor 198. The synchronous motor 198 has one side connected with a wire 200 which leads to one side of switch 178 and to switch blade 144 of relay 142 and to contact 11 of separable connector 98 which as has previously been mentioned, is connected to the switched side of line 100. The other side of motor 198 leads to contact 16 of separable connector 98 and which contact is connected to the unswitched side of line 100. It will be evident that the motor 198 will run continuously so long as switch 78 is closed. In running, motor 198 causes the cams to turn and will first cause opening of switch 176 and then closing of switch 178 and then momentarily closing of switch 174 and thereafter opening of switch 178 and, finally, closing of switch 176.

Operation of the embodiment of Figure 3

In connection with the operation of the embodiment illustrated in FIGURE 3, it will be assumed that the motors 20 and 52 are operating so that the conveyor belts 10 and 16 are running and the plate 14 is vibrating thus causing a continuous flow of material from right to left as viewed in FIGURES 1 and 2. This material in passing across plate 14 spreads out and is vibrated and bounced on the plate so that any foreign objects therein will be sifted down to the point where they will strike the plate thus setting up vibrations therein different from the vibrations created in the plate by the material which is being processed in the system.

The vibrations set up in the plate of both types are picked up by transducer 60 and are supplied to the input of the detector amplifying circuit of panel No. 2. The normal frequencies encountered in handling the material being processed and which frequencies are generally in the lower register, say, up to 3000 cycles per second, are filtered out of the signal whereas higher vibrations created by the sharper ringing sound produced by hard objects striking the plate 14 are passed on through the detector and amplifier system and developed a signal at transformer 130 which is at the output end of the amplifier stage. The sensitivity of the detector and the amplifier stage can be controlled by the single resistor 120 so that changes in the type of material being handled and drifting of tube and circuit component characteristics can be compensated for in a simple manner.

At the time of energizing the system, the switch 78 was closed and this set up the power supply to the power supply stage of panel No. 1 and when the rectifier tube 108 thereof came up to temperature and the power supply was established, the high voltage power supply of this power supply was carried through the energizing coil of relay 150 and back to the voltage supply side of the detector and amplifier stage. Thus, when the circuit became operative, the relay 150 closed and simultaneously the detector and amplifier circuit became operative and the motors 20 and 52 were set into operation.

Upon the generation of signal sufficiently amplified in transformer 130, the coil for relay 142 was energized thus causing the blade 146 thereof to move downwardly thereby short-circuiting the energized coil of relay 150 whereupon relay 150 opens to cause de-energization of motors 20 and 52 thus stopping the conveying of the material.

Upon de-energization of relay 150, the blade 180 thereof closes on its pertaining upper contact thus establishing a circuit from the upper, high voltage side of the short-circuited coil of relay 150 through a voltage reducing resistor 202 to wire 182 which leads, as mentioned before, through reset switch 186 back to the upper end of the coil of relay 142, the other side of which is grounded. This maintains relay 142 energized and prevents the system from again being placed in operation until the re-set switch 186 is opened after the fault, namely, the foreign body on the plate 14 has been cleared. After the foreign body has been found and removed, opening of switch 186 will immediately restore the entire circuit to its original operating condition.

*Operation of checking device*

In order to check the operation of the system periodically, the plunger 64 is availed of for creating in the plate a ringing sound corresponding to that which would be set up therein by a foreign body. This ringing sound however, maintains the device in operation if the circuit is operated properly and causes the device to shut down if the circuit is not operating properly. This is accomplished in the following manner: Motor 198 runs continuously and at predetermined intervals, preferably less than the time required for the material to traverse the plate 14, carries out a cycle of opening and closing of the switches 174, 176 and 178. When the motor 198 runs the switch 176 first opens which prevents the short-circuiting of the operating coil of relay 150 upon energization of relay 142. Immediately thereafter switch 178 closes which closes the circuit to the striker solenoid 62 thus moving striker plunger 64 into position so that the plate will strike it as the plate moves in its vibratory movement thus creating the vibration in the plate which is supposed to actuate the detector. At this time, however the switch 176 is opened so that operation of the detector circuit to cause energization of the relay 142 will not operate to cause de-energization of relay 150.

If the detecting system is in operative condition then the energization coil for relay 142 will be energized and the blades 144 and 146 of the relay will move downwardly. Immediately thereafter switch 174 closes momentarily and if relay 142 is energized the closing of switch 174 will be without effect since it is in an open circuit. However, if relay 142 has failed to operate indicating that the detection system is not in operating order the closing of the switch 174 will short-circuit the operating coil of relay 150 and bring the system to a halt as previously described.

After the checking steps referred to above the three switches will again operate but in the reverse order; switch 174 opening first, and then switch 178 opening and then, finally, switch 176 closing. The system is now restored to its original operating condition for detecting of foreign bodies. The checking described above requires only a fraction of the basic system, it is a most desirable improvement since the device can be operated with full confidence that it will either remain in good operating condition or will shut down so that the fault can be determined.

*Modification of Figure 7*

FIGURE 7 shows a modification in which the detection of foreign bodies is accomplished by the automatic discharge from the conveyor system of a quantity of the material being conveyed including the foreign object. This is accomplished by actuating the air motor 28 simultaneously with interrupting the operation of the conveyors whereby plate 14 is swept clean of the material thereon and which material will, of course, include the foreign body referred to.

This is accomplished by adding a blade to the relay which controls the energization of the conveyor and vibrator motors. This relay is indicated at 220 in FIGURE 7 and will be seen to comprise blade 222 that controls the energization of the coil of the relay pertaining to the motors 20 and 52. This blade corresponds to blade 162 in FIGURE 3. The relay also comprises a blade 224 corresponding to blade 180 in FIGURE 3 that maintains the coil of the tripping relay 142 energized when the device trips upon detecting a foreign body. A third blade 226 of relay 220 has one side connected to contact 6 of the connector 98 that leads to the switched side of power line 100 and this blade is adapted for closing on a contact when the relay is de-energized that is connected by wire 228 with one end of solenoid S1 of the valve 32 pertaining to air motor 28. The other end of solenoid S1 is connected to a contact 230 of a toggle switch 232, the movable contact of which is connected by wire 234 with the contact 16 of separable connector 98 that leads to the other side of incoming power line 100. It will be evident the de-energizing of relay 220 will bring about energization of solenoid S1 to shift valve 32 to cause actuation of air motor 28 so that the side walls 22 and 24 of plate 14 will be thrust laterally thereby to discharge the entire load of material thereon into bin 30.

Carried on one of the side walls is fork 246 which will engage and operate toggle switch 232 toward the end of the aforementioned movement of the said side walls. Actuation of the toggle switch will open the circuit through solenoid S1 whereupon the solenoid will be de-energized thus permitting valve 32 to shift under influence of spring 34 into position to cause retraction of the air motor and the side walls 22 and 24 toward their initial position. As the air motor and side walls approach their initial position the other end of fork 246 will engage the toggle switch and snap it back to its original position. Prior to this movement of the toggle switch 32, however, a member 248 also movable with the fork engages an angle lever 250 so as to operate a re-set switch 252 which corresponds to re-set switch 186 in FIGURE 3. By actuating re-set switch 252 before the toggle switch is snapped back to its original position the detecting circuit is restored to operating condition and the air motor thus makes only one complete operative cycle.

It will be apparent that the modification of FIGURE 7 is characterized in that it is fully automatic and operates to discharge detected foreign objects together with as much material as may be necessary to insure that the foreign object is picked up by the discharging mechanism, and then automatically restores the entire system to operation whereby only a momentary interruption in the conveying cycle is had.

It will be understood that the FIGURE 7 modification represents an additional refinement and that all of the elements of the FIGURE 3 arrangement will be contained within the complete system.

Since it may at times be necessary for the system to be operated without the benefit of the detecting mechanism of the present invention as, for example, when the mechanism is being repaired or the like, it is advantageous to provide means for energizing relay 166 independently of the detecting mechanism. This can be accomplished by a selector switch 260 which may be contained within switch housing 72 and which is connected as illustrated in FIGURE 3 so as to by-pass the detecting system. Normally this switch is open but it will be evident that it may be closed and thus connect coil 166 directly across the incoming power line 100.

When switch 260 is closed a yellow lamp 262 is illuminated showing the device to be operating without the detector system being in operation.

It will be evident that the electrode tube circuit illustrated above would find its full equivalent in a transistor circuit and that any one skilled in the art of constructing circuits could provide a transistor circuit to perform the functions disclosed in this application.

It will also be evident that the particular manner in which the plate 14 is cleared of material is subject to change depending upon the particular arrangement in which the detecting device is placed. For example, it is considered feasible to tilt the plate 14 in response to the detecting of a foreign body thereon and in this manner somewhat simplify the structure.

It will also be evident that still other means could be employed for automatically removing the foreign bodies from the stream of moving material in certain circumstances as, for example, where the stream of moving material was composed of discreet objects so that the stream could be narrowed out at the time of passing over the detecting station. In such a case it might be possible to utilize an air blast which would quickly blow off the foreign body at about the instant it was detected and thus substantially eliminate any interruption in the travel of the material being passed through the detecting station.

It has been mentioned before that the plate does not necessarily have to be a flat element but that it could be curved so as to be convex toward the material passing thereover or concave toward the material. The plate could, in fact, be a complete cylinder with the materail passing therethrough, the important thing being for the material and any foreign bodies entrained therein to strike the plate in a manner to create vibrations therein.

Further, the plate has been described as a metal member, but it will be evident that any stiff member capable of vibrating and transmitting vibrations efficiently could be employed. Thus, a hard plastic, or glass, or ceramic could be employed in the practice of the present invention with equal success.

It will further be evident that while the foreign bodies to be detected are generally harder than the material in which the foreign bodies are entrained, it is conceivable that the foreign bodies might be softer than the other material. The present invention is, of course, adapted for effecting detecting or detecting and separating operations in this case, also, since the disclosed and described arrangement can readily discriminate between the different frequencies established in the stiff member by the harder and softer materials striking against the member.

It will be understood that this invention is susceptible to modification in order to adapt it to different usages and conditions and, accordingly, it is desired to comprehend such modifications within this invention as may fall within the scope of the appended claims.

We claim:

1. In a foreign body detector of the nature described; a generally horizontal metallic plate, means for shaking the plate so that flowable bulk material passing across the plate will bounce thereon whereby foreign bodies entrained in the material will strike the plate and set up vibrations therein different from what are normally set up therein by the material, a detector connected with the plate, an amplifying circuit fed by the detector and including filtering means for filtering out the vibrations set up by the said material whereby the actual signal to the amplifying circuit is created by the vibrations of a foreign body in the said material, means responsive to the output from said amplifying circuit for interrupting movement across the plate and for interrupting the shaking of the plate, a metallic striker for striking the plate and normally in ineffective position, means for periodically making the means for interrupting the shaking of the plate inoperative for a brief interval and means operable during the said interval for moving the striker into effective position so that it strikes said plate, and there being means responsive to an amplified output from said circuit due to the striking of the plate for causing restoring of the said means for interrupting the shaking of the plate at the end of said interval.

2. In a detecting arrangement of the nature described; a shaking plate conveyor comprising a stiff plate which will vibrate when struck, a transducer pick up attached to the plate for detecting vibrations created in the plate by foreign objects entrained in flowable bulk material which will strike the plate as the material is conveyed thereover by shaking of the plate, a motor connected to the plate operable when energized for shaking the plate, a contactor in circuit with the motor energizable for energizing the motor, a first relay in circuit with the contactor energizable for energizing said contactor, an amplifying circuit connected to the transducer pick up so as to be fed the said vibrations detected by the transducer pick up, and a second relay in circuit with said first relay and connected for energization in response to a predetermined output from said amplifier and operable when energized for de-energizing said first relay thereby to deenergize said contactor and thus halt said motor.

3. In a detecting arrangement of the nature described; a shaking plate conveyor comprising a stiff plate which will vibrate when struck, a transducer pick up attached to the plate for detecting vibrations created in the plate by foreign objects entrained in flowable bulk material which will strike the plate as the material is conveyed thereover by shaking of the plate, a motor connected to the plate operable when energized for shaking the plate, a contactor in circuit with the motor energizable for energizing the motor, a first relay in circuit with the contactor energizable for energizing said contactor, an amplifying circuit connected to said transducer pick up so as to be fed the said vibrations detected by the transducer pick up, and a second relay in circuit with said first relay and connected for energization in response to a predetermined output from said amplifier and operable when energized for de-energizing said first relay thereby to deenergize said contactor and thus halt motor, said first relay being operative when de-energized for establishing an energizing circuit for said second relay.

4. In a detecting arrangement of the nature described; a shaking plate conveyor comprising a stiff plate which will vibrate when struck, a transducer pick up attached to the plate for detecting vibrations created in the plate by foreign objects entrained in flowable bulk material which will strike the plate as the material is conveyed thereover by shaking of the plate, a motor connected to the plate operable when energized for shaking the plate, a contactor in circuit with the motor energizable for energizing the motor, a first relay in circuit with the contactor energizable for energizing said contactor, an amplifying circuit connected to said transducer pick up so as to be fed the said vibrations detected by the transducer pick up, and a second relay in circuit with said first relay and connected for energization in response to a predetermined output from said amplifier and operable when energized for de-energizing said first relay whereby to deenergize said contactor and thus halt said motor, said first relay being operative when de-energized for establishing an energizing circuit for said second relay, and normally closed reset switch means in said last mentioned circuit whereby opening of said reset switch means will restore the system to its original operative condition.

5. In a detecting arrangement of the nature described; a shaking plate conveyor comprising a stiff plate which will vibrate when struck, a transducer pick up attached to the plate for detecting vibrations created in the plate by foreign objects entrained in flowable bulk material which will strike the plate as the material is conveyed thereover by shaking of the plate, a motor connected to the plate operable when energized for shaking the plate, a contactor in circuit with the motor energizable for energizing the motor, a first relay in circuit with the contactor energizable for energizing said contactor, an amplifying circuit connected to said transducer pick up so as to be fed the said vibrations detected by the transducer pick up, and a second relay in circuit with said first relay and connected for energization in response to a predetermined output from said amplifier and operable when energized for de-energizing said first relay thereby to deenergize said contactor and thus halt said motor, there being auxiliary switch means for energizing the said contactor independently of said first relay whereby said motor can be controlled independently of the detecting and amplifying system.

6. In an arrangement for detecting the presence of foreign objects in flowable bulk material wherein the objects are of different hardness than the material; a hard member, means for flowing the material together with the entrained foreign objects across the member while supported by the member and in substantially unconfined condition while simultaneously agitating the material so the foreign objects will engage the member and set up vibrations therein, and which vibrations are of a different frequency than the vibrations set up in the member by the said material on account of the different hardness of the foreign objects, means attached to the member for detecting vibrations set up in the member by said material and by said foreign objects, and means for amplifying selected of the vibrations to create a measurable signal.

7. In an arrangement for detecting the presence of foreign objects in flowable bulk material wherein the objects are of a different hardness than the material; a hard member of substantial area, means for flowing the material together with the entrained foreign objects across the member while supported by the member and in substantially unconfined condition while simultaneously agitating the material so the foreign objects will engage the member and set up vibrations therein, and which vibrations are of a different frequency than the vibrations set up in the member by the said material on account of the difference in hardness of the foreign objects, means attached to the member for detecting vibrations set up in the plate, and means for amplifying a selected range of the vibrations to create a measurable signal.

8. In an arrangement for detecting the presence of foreign objects in flowable bulk material wherein the objects are of different hardness than the material; a hard plate-like member, means for flowing the material together with the entrained foreign objects across the member while supported by the member and in substantially unconfined condition while simultaneously agitating the material so the foreign objects will engage the member and set up vibrations therein, and which vibrations are of a different frequency than the vibrations set up in the member by the said material on account of the difference in hardness of the foreign objects, means attached to the member for detecting vibrations set up in the member, and means for amplifying a selected range only of the vibrations to create a measurable signal, said member being generally horizontal.

9. In an arrangement for detecting the presence of foreign objects in flowable bulk material wherein the objects are of such physical nature that when they strike a hard member capable of vibrating vibrations will be set up thereby which are different than what are set up by the said material striking the hard member, a hard plate-like member, means for supplying the material to one region of the member in substantially unconfined condition, means for causing the material to advance across the member while simultaneously agitating the unconfined material so the foreign objects will engage the member and set up vibrations therein, means attached directly to the member for detecting vibrations set up in the member, and means for amplifying a selected range only of the vibrations to create a measurable signal.

10. In an arrangement for detecting the presence of foreign objects in flowable bulk material wherein the objects are of a different hardness than the material; a hard plate, means for supplying the material to one end of the plate in substantially unconfined condition, means for shaking the plate to advance the material across the plate while simultaneously agitating the unconfined material so that foreign objects will engage the plate and set up vibrations therein, and which vibrations are of a different frequency than the vibrations set up in the plate by the said material on account of the different hardness of the foreign objects, means for detecting vibrations set up in the plate, and means for amplifying a selected range only of the vibrations to create a measurable signal, said plate being substantially horizontal.

11. In an arrangement for detecting the presence of foreign objects in flowable bulk material wherein the objects are of a different hardness than the material; a hard plate, means for flowing the material together with the entrained foreign objects across the plate in substantially unconfined condition while simultaneously agitating the material so the foreign objects will engage the plate and set up vibrations therein, and which vibrations are of a different frequency than the vibrations set up in the plate by the said material on account of the difference in hardness of the foreign objects, means for detecting vibrations set up in the plate, and means for amplifying a selected range only of the vibrations to create a measurable signal, there being means responsive to said signal for controlling the supply of material to the plate.

12. In an arrangement for detecting the presence of foreign objects in flowable bulk material wherein the objects are of a different hardness than the material; a hard plate, means for supplying the material to one end of the plate in substantially unconfined condition, means for shaking the plate to advance the material across the plate while simultaneously agitating the unconfined material so the foreign objects will engage the plate and set up vibrations therein, and which vibrations are of a different frequency than the vibrations set up in the plate by the said material on account of the difference in hardness of the foreign objects, means for detecting vibrations set up in the plate, and means for amplifying a selected range only of the vibrations due to one of the foreign objects and the material to create a measurable signal, first means responsive to said signal for controlling the supply of material to the plate, and second means also responsive to said signal for controlling the shaking movement of the plate.

13. In an arrangement for detecting the presence of foreign objects in flowable bulk material; a metallic plate, conveyor means for supplying flowable bulk material to the plate at one end and for receiving the material and conveying it from the plate at the other end, means for agitating the material while simultaneously causing movement of the material across the plate from said one end of the plate to the other in an unconfined condition whereby the material engages the plate and creates vibrations therein while a foreign body of a different physical nature than the material entrained in the material will also engage the plate and create vibrations therein of a different frequency, a pick up transducer attached directly to the plate to detect the vibrations set up therein, an amplifying circuit receiving the detected vibrations from said transducer, filter means in the circuit for filtering out from the detected vibrations the vibrations normal to one of the material being conveyed and the foreign objects whereby the other frequencies make up the actual output of the amplifier, and control means responsive to a predetermined output from said amplifier circuit for controlling said conveyor means.

14. In an arrangement for detecting the presence of foreign objects in flowable bulk material; a metallic plate, conveyor means for supplying flowable bulk material to the plate at one end and for receiving the material and conveying it from the plate at the other end, means for agitating the material while simultaneously causing movement of the material across the plate from said one end of the plate to the other in an unconfined condition whereby the material engages the plate and creates vibrations therein while a foreign body of a different density than the material entrained in the material will also engage the plate and create vibrations therein of a different frequency, a pick up transducer attached to the plate to detect the vibrations set up therein, an amplifying circuit connected to the transducer for receiving the detected vibrations from said transducer, filter means in the circuit for filtering out from the detected vibrations the vibrations normal to the material being conveyed whereby the said different frequencies make up the actual output of the amplifier, control means responsive to the output from said amplifier circuit for automatically halting said conveyor, and means operated by said control means operable to discharge the material on the plate laterally therefrom to remove from the stream of material that portion thereof containing the foreign object.

15. In an arrangement for detecting the presence of foreign objects in flowable bulk material; a metallic plate, conveyor means for supplying flowable bulk material to the plate at one end and for receiving the material and conveying it from the plate at the other end, means for agitating the material while simultaneously causing movement of the material across the plate from said one end of the plate to the other in an unconfined condition whereby the material engages the plate and creates vibrations therein while a foreign body of a different density than the material entrained in the material will also engage the plate and create vibrations therein of a different frequency, a pick up transducer attached to the plate to detect the vibrations set up therein, an amplifying circuit connected to the transducer for receiving the detected vibrations from said transducer, filter means in the circuit for filtering out from the detected vibrations the vibrations normal to the material being conveyed whereby the said different frequencies make up the actual output of the amplifier, and control means responsive to the output from said amplifier circuit for automatically halting said conveyor means, and means operated by said control means operable to discharge the material on the plate laterally therefrom to remove from the stream of material that portion thereof containing the foreign object, there also being means operable in response to the said discharge of material from the plate for again initiating operation of said conveyor means.

16. In an arrangement for detecting the presence of foreign objects in flowable bulk material; incoming and outgoing conveyor means, a shaker type conveyor interconnecting the incoming and outgoing conveyor means and comprising a hard plate, said conveyor means and conveyor being adapted for handling flowable bulk material, said shaker type conveyor moving material delivered thereto from the incoming conveyor to the outgoing conveyor with simultaneous agitation of the material whereby the material and foreign bodies therein of a hardness different from the hardness of the material will engage the plate and set up vibrations of different frequencies therein side walls along the side edges of the plate, a transducer pick up attached to the plate for actuation by vibrations set up in the plate to produce an output, an amplifying circuit connected to the transducer to receive the said output therefrom as a signal, means for filtering out from the signal the vibrations normal to the material being passed across the plate whereby foreign bodies of different density than the material which may be entrained in the material will create the actual input to the amplifier, said amplifier developing an output proportional to the input thereto, and control means responsive to the output of said amplifier circuit for interrupting operation of said conveyor means and conveyor, and said control means also being operable for causing movement of the said side walls laterally of the plate whereby to discharge from the plate the material thereon and which material will contain the foreign body that developed the signal to halt the operation of the conveyor means and conveyor.

17. In an arrangement for detecting the presence of foreign objects in flowable bulk material; incoming and outgoing conveyor means, a shaker type conveyor interconnecting the incoming and outgoing conveyor means and comprising a hard plate, said conveyor means and conveyor being adapted for handling flowable bulk material, said shaker type conveyor moving material delivered thereto from the incoming conveyor to the outgoing conveyor with simultaneous agitation of the material whereby the material and foreign bodies therein of a hardness different from the hardness of the material will engage the plate and set up vibrations of different frequencies therein side walls along the side edges of the plate, a transducer pick up attached to the plate for actuation by vibrations set up in the plate to produce an output, an amplifying circuit connected to the transducer to receive the output therefrom as a signal, means for filtering out from the signal the vibrations normal to the material being passed across the plate whereby foreign bodies of different density than the material which may be entrained in the material will create the actual input to the amplifier, said amplifier developing an output proportional to the input thereto, and control means responsive to the output of said amplifier circuit for interrupting operation of said conveyor means and conveyor, said control means also being operable for causing movement of the said side walls laterally of the plate whereby to discharge from the plate the material thereon and which material will contain the foreign object that developed the signal to halt the operation of the conveyor means and conveyor, and means operable automatically for returning the side wall to their initial position following the discharge of material from the plate and for again setting the conveyor means and conveyor into operation.

18. In a foreign body detector; a hard plate, means for causing movement of flowable bulk material in substantially unconfined condition across the plate while supported by the plate from end to end thereof while simultaneously agitating the material whereby the material and foreign bodies therein of a hardness different from the hardness of the material will engage the plate and set up vibrations of different frequencies therein, a detector connected with the plate for detecting vibrations therein, an amplifying circuit fed by the detector and including filtering means for filtering out the vibrations set up in the plate by one of the said material and foreign bodies whereby the actual signal to the amplifying circuit is created by the vibrations set up in the plate by the other of said material and foreign bodies, said amplifying circuit producing an output proportional to said signal, means responsive to the output from said amplifying circuit for controlling the operation of the said means causing movement of the material across the plate, a striker having substantially the same hardness as the expected hardness of one of said material and foreign bodies which develop vibrations of the frequencies that form the signal to the amplifying circuit, said striker being actuatable for striking the plate, means for periodically making the means for controlling the operation of the means for moving material across the plate inoperative for a brief interval, means operable during said interval for actuating the striker so that it strikes the plate, and means responsive to the output from said amplifying circuit due to the striking of the plate by the striker for again making operative the said means for controlling the means for causing movement of the material across the plate.

19. In a foreign body detector; a hard plate, means for causing movement of flowable bulk material in substantially unconfined condition across the plate while supported by the plate from end to end thereof while simultaneously agitating the material whereby the material and foreign bodies therein of a hardness different from the hardness of the material will engage the plate and set up vibrations of different frequencies therein, a detector connected with the plate for detecting vibrations therein, an amplifying circuit fed by the detector and including filtering means for filtering out the vibrations set up in the plate by the said material whereby the actual signal to the amplifying circuit is created by the vibrations set up in the plate by a foreign body in said material, said amplifying circuit developing an output proportional to said signal means responsive to the output from said amplifying circuit for interrupting operation of the said means causing movement of the material across the plate, a striker actuatable for striking the plate, said striker having about the same hardness as the expected hardness of said foreign bodies, means for periodically making the means for interrupting the operation of the means for moving material across the plate inoperative for a brief interval and means operable during said interval for actuating the striker so that it strikes the plate, and means responsive to an amplified output from said amplifying circuit due to the striking of the plate by the striker for again making operative the said means for interrupting the means for causing movement of the material across the plate, said brief interval being shorter in duration than the time required for any part of the material moving across the plate to move completely thereacross.

20. In a device for detecting the presence of bodies of one hardness entrained in bodies of another hardness; a stiff member which will vibrate when struck by the bodies, a detector sensitive to vibrations attached to the member operable to develop an electrical signal when the member vibrates, means for moving the bodies in substantially unconfined condition into vibration creating engagement with the member, a filter circuit connected to the detector to receive the electrical signal therefrom operable to pass selected frequencies only, an amplifying circuit connected to the filter circuit to receive the signal therefrom, said signal consisting of the said passed frequencies, and signalling means operated by the output from the amplifying circuit for signalling the engagement of the member by a body which creates vibrations of the frequency which the filter circuit will pass.

21. A method of detecting a foreign body entrained in a moving stream of flowable bulk material and wherein the physical characteristics of the foreign body is different from the material with respect at least to hardness, which comprises; passing the stream of material over a relatively stiff member in a loose and substantially unconfined state with simultaneous agitation of the material whereby the member is caused to vibrate by the material and whereby the foreign body in the material will set up vibrations of a different frequency in the said member, and detecting and amplifying the said vibrations due to the foreign body to provide an indication of the presence or absence of a foreign body in the stream of material.

22. A method of separating foreign bodies of one hardness from flowable bulk material of a different hardness in which the bodies are entrained which comprises; bouncing the material in a loose and substantially unconfined state on a plate whereby vibrations are set up in the plate by the material and whereby any foreign bodies in the material will also cause vibration of the plate at a different frequency, detecting and amplifying the said vibrations of the different frequency, halting the movement of the material upon the detection of the foreign body, and removing the foreign body from the material.

23. A method of separating articles of one hardness from flowable bulk material of another hardness in which the articles are entrained at random which comprises; bouncing the material across a plate in a loose and substantially unconfined state so that the said material and articles set up vibrations therein, detecting the said vibrations, filtering out from the detected signal the vibrations peculiar to one of said articles and material, amplifying the remaining signal, and operating a separating mechanism by the said amplified signal.

24. The method of removing a foreign body of one hardness from a flowable bulk material of another hardness in which it is entrained which comprises; conveying the material, passing the conveyed material in a loose and substantially unconfined state across a shaker plate whereby vibrations are set up in the plate by the material and any foreign body therein, detecting the vibrations in the plate and filtering out from the detected signal the vibrations pertaining to the said material, amplifying the remaining signal, and discharging the material on the plate therefrom upon the development of a predetermined output from the amplifier.

References Cited in the file of this patent

UNITED STATES PATENTS

| | | |
|---|---|---|
| 1,757,810 | Newman | May 6, 1930 |
| 1,964,733 | Homan | July 3, 1934 |
| 1,973,414 | Miller | Sept. 11, 1934 |
| 2,112,621 | Henszey et al. | Mar. 29, 1938 |
| 2,186,652 | Orth | Jan. 9, 1940 |
| 2,208,202 | Stanton et al. | July 16, 1940 |
| 2,617,526 | La Pointe | Nov. 11, 1952 |
| 2,761,998 | Chen | Sept. 4, 1956 |
| 2,781,479 | Rice | Feb. 12, 1957 |